United States Patent [19]

Nakagawa et al.

[11] Patent Number: 4,552,925

[45] Date of Patent: Nov. 12, 1985

[54] TETRAFLUOROETHYLENE/HEXA-FLUOROPROPYLENE COPOLYMER HAVING IMPROVED EXTRUDABILITY

[75] Inventors: Shinichi Nakagawa, Nara; Kohzoh Asano, Osaka; Shinsuke Sakata, Osaka; Tokio Adachi, Osaka; Shoji Kawachi, Nishinomiya, all of Japan

[73] Assignee: Daikin Kogyo Co., Ltd., Osaka, Japan

[21] Appl. No.: 472,838

[22] Filed: Mar. 7, 1983

[30] Foreign Application Priority Data

Mar. 8, 1982 [JP] Japan ................................. 57-37067

[51] Int. Cl.$^4$ .................... C08F 214/26; C08F 214/28
[52] U.S. Cl. .................................... 525/200; 525/199; 526/247; 526/249; 526/254
[58] Field of Search ............ 526/254, 247, 249; 525/199, 276, 200

[56] References Cited

U.S. PATENT DOCUMENTS

| | | | |
|---|---|---|---|
| 2,549,935 | 4/1951 | Sauer ................................ | 526/254 |
| 2,946,763 | 7/1960 | Bro et al. ........................... | 526/254 |
| 3,023,196 | 2/1962 | Bro ..................................... | 526/254 |
| 3,051,683 | 8/1962 | Mallouk ............................ | 525/199 |
| 3,062,793 | 11/1962 | Eleuterio .......................... | 526/254 |
| 3,132,124 | 5/1964 | Couture et al. .................... | 526/254 |
| 3,969,435 | 7/1976 | Bailey et al. ...................... | 525/199 |
| 4,001,351 | 1/1977 | Roura ................................ | 526/254 |
| 4,105,716 | 8/1978 | Sakai et al. ....................... | 525/276 |

*Primary Examiner*—Harry Wong, Jr.
*Attorney, Agent, or Firm*—Birch, Stewart, Kolasch & Birch

[57] ABSTRACT

Mixture of tetrafluoroethylene/hexafluoropropylene (TFE/HFP) copolymers comprising 5 to 20% by weight of hexafluoropropylene, the specific melt viscosity at 380° C. of which is from $1 \times 10^4$ to $60 \times 10^4$ poise, (a) the melt flow ratio being at least 3.5, and
(b) the zero strength time (ZST, second) at 380° C. satisfying the following equation:

$$ZST \geq \tfrac{1}{3}x^2 + 17x + 107$$

wherein x is (specific melt viscosity)$\times 10^{-4}$ having an improved extrudability, particularly an improved extrusion speed. These mixtures of copolymers contain a high specific melt viscosity portion and a low specific melt viscosity portion.

12 Claims, No Drawings

TETRAFLUOROETHYLENE/HEXAFLUOROPROPYLENE COPOLYMER HAVING IMPROVED EXTRUDABILITY

This invention relates to a mixture of tetrafluoroethylene (hereinafter referred to as "TFE")/hexafluoropropylene (hereinafter referred to as "HFP") copolymers having an improved extrudability, particularly an improved extrusion speed.

It is known that a copolymer of TFE and HFP (hereinafter referred to as "FEP copolymer") is a melt-moldable fluororesin and has excellent electrical properties, heat resistance, chemical resistance and weather resistance. It is easily molded by any mode of molding, for example, compression molding, extrusion molding, injection molding and powder coating and formed as a coated wire, a tube, a pipe, a film, a sheet and monofilaments by extrusion molding and various kinds of articles by compression or injection molding.

When a melt-moldable resin is formed by extruding the melted resin through a narrow gap or orifice at a speed higher than a certain specific value for a specific resin, surface roughness (i.e. melt fracture) appears on the outer and/or inner surfaces of the extruded article or the interface between the resin and the substrate to be coated. Since the FEP copolymer containing 5 to 20% by weight of HFP has a low critical shear rate (i.e. a limit shear rate at which the melt fracture begins to appear), the melt fracture appears at a comparatively low extrusion speed. Therefore, it is impossible to extrude the FEP copolymer at a high extrusion speed and particularly impossible to raise the molding speed higher than a certain specific value when the FEP copolymer is extruded through a narrow gap or expanded at a high speed.

The FEP copolymer has drawbacks including the very low critical extrusion speed as described above. For overcoming these drawbacks of the FEP copolymer, it has been proposed to lower the melt viscosity of the FEP copolymer. However, when the melt viscosity is lowered, the mechanical strength, particularly the stress cracking resistance of the molded article is deteriorated. In order to lower the melt viscosity while maintaining the mechanical strength of the molded article, a FEP copolymer containing a greater amount of HFP has been introduced. Such FEP copolymer is not advantageous because of the drawbacks in the production, for example, a low polymerization rate.

It has been also proposed to mold the FEP copolymer at an excessive extrusion shear rate (cf. Japanese Patent Publication No. 20578/1961). However, in this process, the incompletely melted FEP copolymer is extruded, so that the extruded FEP copolymer article has deteriorated mechanical properties such as tensile strength and elongation. Further, a constant extrusion speed is not achieved continuously during the molding step, which results in uneven wall thickness.

As a result of an extensive study to obtain a FEP copolymer by which any melt fracture does not appear even at a high molding rate, it has now been found that the mixture of FEP copolymers having certain specific properties as described hereinbelow has excellent extrudability, for example, 50% higher extrusion speed in wire coating than the conventional FEP copolymers.

According to the present invention, there is provided mixture of tetrafluoroethylene/hexafluoropropylene copolymers comprising (a) 10 to 70% by weight of a tetrafluoroethylene/hexafluoropropylene copolymer comprising 5 to 20% by weight of hexafluoropropylene, having a specific melt viscosity at 380° C. of from $100 \times 10^4$ to 1,000 to $10^4$ poise, and (b) 90 to 30% by weight of a tetrafluoroethylene/hexafluoropropylene copolymer comprising 5 to 20% by weight of hexafluoropropylene, having a specific melt viscosity at 380° C. of from $0.1 \times 10^4$ to $60 \times 10^4$ poise, having a specific melt viscosity at 380° C. of which is from $1 \times 10^4$ to $60 \times 10^4$ poise, (a) a melt flow ratio being at least 3.5, and (b) a zero strength time (ZST, second) at 380° C. satisfying the following equation:

$$ZST \geq \tfrac{1}{8}x^2 + 17x + 107$$

wherein x is (specific melt viscosity) $\times 10^{-4}$.

The mixture of FEP copolymers of the invention, having a limited range of the melt flow ratio and the ZST, has an improved moldability. In the present invention, the ZST is defined in accordance with the melt viscosity, since the former is greatly affected by the latter.

When the melt flow ratio or the ZST is lower than the above lower limit, the moldability of the FEP copolymers is not satisfactorily improved.

The main object of the present invention is the improvement of the moldability of the FEP copolymers at a high molding rate. This moldability directly relates to the melt flow characteristics of the FEP copolymer, and in particular, the melt flow ratio and the ZST.

It is usually inevitable in polymerization that a mixture of polymers having different molecular weights or different melt viscosities is obtained, though the molecular weight of the polymer is controlled by adjusting the monomer concentration, properties (for example, decomposition rate) of the polymerization initiator and the kind and concentration of the chain transfer agent. Nevertheless, in the conventional polymerization, the distribution of the molecular weight of the polymer is not changed greatly.

On the contrary, the mixture of FEP copolymers of the invention is characterized by the individual FEP copolymer components of the mixture having greatly different melt viscosities.

In general, the mixture of FEP copolymers of the present invention is obtained as a mixture of a FEP copolymer having a very high specific melt viscosity and a FEP copolymer having a comparatively low specific melt viscosity.

The mixture of FEP copolymers of the invention is prepared by copolymerizing TFE and HFP under the conditions to produce 10 to 70% by weight of a FEP copolymer having a high specific melt viscosity at 380° C. of, for example, from $100 \times 10^4$ to $1,000 \times 10^4$ poise, preferably from $150 \times 10^4$ to $600 \times 10^4$ poise, and a FEP copolymer having a low specific melt viscosity at 380° C. of, for example, from $0.1 \times 10^4$ to $60 \times 10^4$ poise, preferably from $0.5 \times 10^4$ to $20 \times 10^4$ poise. The FEP copolymer having the high specific melt viscosity at 380° C. is not suitable for molding by itself due to its excessively high melt viscosity, and the FEP copolymer having the low specific melt viscosity at 380° C. is also not suitable by itself for molding since its molecular weight is so low that a molded article made therefrom has poor mechanical properties. On the contrary, the mixture of FEP copolymers of the present invention, having a high specific melt viscosity portion and a low specific melt viscosity portion, is suitable for molding. For example, the mixture of FEP copolymers of the invention is prepared by firstly forming by a polymerization reaction or adding a certain amount of a FEP copolymer having the high specific melt viscosity in a polymerization system and then subsequently forming the FEP copolymer having the low specific melt viscosity by adding a chain transfer agent or by accelerating the decomposition rate of the initiator with addition of additional initiator, heating or addition of a decomposition accelerator to the polymerization system. These two polymerization steps may be effected in any order or alternately. Alternatively, it is prepared by conducting separate polymerization reactions to form the FEP copolymers having the high and low specific melt viscosities respectively and then mixing them in a powder or particle form, or melting them and forming the melted copolymers in the shape of particles.

For the preparation of the mixture of FEP copolymers of the present invention, various modes of polymerization such as emulsion polymerization, suspension polymerization, aqueous suspension polymerization, etc. may be employed. The polymerization initiator may be selected from the conventional ones used in the polymerization of the conventional FEP copolymer according to the employed polymerization mode. Preferably, partially or completely fluorinated dialkylperoxides are used.

As described above, in the preparation of the mixture of FEP copolymers of the present invention, the FEP copolymer portion having the high specific melt viscosity may be obtained by the polymerization of TFE and HFP in the absence of a chain transfer agent. The FEP copolymer portion having the low specific melt viscosity may be obtained by accelerating the decomposition rate of the initiator or lowering the monomer concentration during the polymerization of the FEP copolymer portion having the high specific melt viscosity, by degrading the FEP copolymer portion having the high melt viscosity thermally or mechanically, or most preferably by the addition of the transfer agent during the polymerization of the FEP copolymer portion having the high specific melt viscosity. The amount and addition time of the chain transfer agent may be easily determined by those skilled in the art according to the melt viscosities of the FEP copolymers having the high and low specific melt viscosities and the ratio thereof.

The specific examples of the chain transfer agents are hydrocarbons (eg. butane, pentane, hexane, cyclohexane, etc.), lower alkanols (eg. methanol, ethanol, etc.), halogenated hydrocarbons (eg. carbon tetrachloride, chloroform, methylene chloride, trichlorofluoromethane, etc.) and ketones (eg. methyl ethyl ketone, etc.). Among them, the alkanols are most preferable since they have adequate chain transferring properties and do not lower the polymerization rate significantly.

Other polymerization conditions such as the temperature and the pressure are not critical and may be the same as employed in the conventional copolymerization of TFE and HFP. For example, in the suspension polymerization, the polymerization temperature may be from 10° to 50° C., preferably from 20° to 40° C., and more preferably a temperature around room temperature, and the polymerization pressure may be from 5 to 25 Kg/cm$^2$G.

The melt viscosity of the mixture of FEP copolymers of the present invention is easily calculated from those of the FEP copolymers having the high and low specific melt viscosities and their ratio by a per se conventional method.

The mixture of FEP copolymers of the present invention may contain the third comonomer(s) copolymerizable with TFE and HFP in an amount not more than about 5% by weight. The specific examples of the third monomer are perfluorovinyl ethers, perfluoroallyl ethers, trifluorochloroethylene, trifluoroethylene, vinylidene fluoride, ethylene and propylene.

Perfluoropolymers having excellent heat resistance may be blended with the mixture of FEP copolymers of the invention. The specific examples of the perfluoropolymers are polytetrafluoroethylene, copolymers of tetrafluoroethylene and perfluorovinyl ethers or perfluoroallyl ethers. The amount of the perfluoropolymers to be blended is not more than 20% by weight on the basis of the weight of the FEP copolymer of the invention.

The present invention will be hereinafter explained further in detail by the following Examples in which parts and % are by weight.

Characteristics and physical properties of the copolymers obtained in the Examples are measured as follows:

(a) Content of HFP in FEP copolymer

Content of HFP is determined by measuring the infrared spectrum of a film of 0.5±0.01 mm in thickness which is formed at 350° C. The content of HFP is calculated according to the following equation:

$$\text{HFP content (\%)} = \frac{D_{980\ cm^{-1}}}{D_{2,350\ cm^{-1}}} \times 3.2$$

wherein $D_{980\ cm^{-1}}$ is the absorbance at 980 cm$^{-1}$, and $D_{2,350\ cm^{-1}}$ is that at 2,350 cm$^{-1}$.

(b) Specific melt viscosity

A Koka-type flow tester is used. A copolymer is charged in a cylinder of 9.5 mm in inner diameter and kept at 380° C. for 5 minutes. Then, the copolymer is extruded from an orifice of 2.1 mm in inner diameter and 8 mm in length under a piston load of 5 Kg. The specific melt viscosity is calculated by dividing 53,150 by the extrusion rate (g/min.).

(c) Die swell

A melt-indexer (Takara Seisakusho) is used. A copolymer (5 g) is charged in a cylinder of 9.55 mm in inner diameter and kept at 380° C. for 5 minutes. Then, the copolymer is extruded from an orifice of 2 mm in inner diameter and 8 mm in length vertically downward under a piston load of 5 Kg. The copolymer extruded in the first one minute is discarded and then an extruded copolymer of 40±5 mm in length is obtained and kept at room temperature for at least 10 minutes. Diameters of the extruded copolymer at four points at regular intervals are measured. The above procedures are repeated two more times and the diameters are averaged. The die swell is calculated according to the following equation:

$$\text{Die swell} = \frac{D_2 - D_1}{D_1}$$

wherein $D_1$ is the inner diameter of the orifice, and $D_2$ is the average outer diameter of the extruded polymer.

(d) Melt flow ratio

A copolymer is extruded with the same flow tester as used in the measurement of the specific melt viscosity under the same conditions. Extrusion speed is an extruded volume of the copolymer per unit time. The extrusion speeds under 7 and 20 Kg/cm² are measured respectively. The melt flow ratio is calculated according to the following equation:

$$\text{Melt flow ratio} = \frac{\text{Extrusion speed under 20 Kg/cm}^2}{\text{Extrusion speed under 7 Kg/cm}^2}$$

(e) ZST (zero strength time)

ZST is measured according to ASTM D 1430.

A sample piece is prepared from a sheet of 2.0±0.2 mm in thickness obtained by charging a copolymer in a mold of 120 mm in inner diameter, heating at 310° C. for 20 minutes and pressing under 40 Kg/cm² while cooling.

The sample piece is loaded with 0.5 g at 280° C., and the period of time (seconds) until the sample is broken is measured.

EXAMPLE 1

In a glass-lined polymerization vessel equipped with a stirrer which can contain 5,000 parts of water, demineralized and deaerated water (1,300 parts) and sodium bicarbonate (1 part) were charged. The interior was replaced thoroughly with nitrogen and evacuated. HFP (1,300 parts) was injected and the mixture in the vessel was stirred at 24° C. Then, the vessel was pressurized with TFE to 8.4 Kg/cm²G. As soon as di-(ω-hydrodecafluoroheptanoyl)peroxide (1.8 parts) dissolved in 1,1,2-trichlorotrifluoroethane, the polymerization was initiated. During the reaction period, TFE was injected continuously to keep the pressure constant as the pressure dropped.

After 2 and 4 hours from the reaction initiation, the same initiator (each 0.9 part) was added and after 6 hours, the same initiator (0.36 part) was added. Then, the same initiator (each 0.36 part) was added every 5 hours. After 9 hours from the reaction initiation, methanol (44 parts) was added. After the polymerization was continued for 49 hours, unreacted monomer and then the copolymer were recovered. After drying, the copolymer (935 parts) was obtained. M.P., 269° C. Content of HFP, 12.5%. Specific melt viscosity, $7.0 \times 10^4$ poise. Melt flow ratio, 4.54. ZST, 280 seconds.

With the specific melt viscosity of the obtained copolymer, the right-hand member of the equation (2) was 242 seconds, and the ZST value of 280 seconds satisfied the equation (2).

The results of the preliminary experiments showed that the specific melt viscosity of the copolymer obtained before the addition of methanol was $320 \times 10^4$ poise and that of the copolymer obtained after the addition of methanol was $2 \times 10^4$ poise. In example 1, the weight ratio of the former to the latter was 25:75.

Comparative Example 1

In the same manner as in Example 1 but initiating the polymerization after the addition of methanol (31 parts) and continuing the polymerization for 50 hours, the polymerization was effected to obtain the copolymer (1,090 parts). M.P., 270° C. Content of HFP, 12.5%. Specific melt viscosity, $6.5 \times 10^4$ poise. Melt flow ratio, 3.28. ZST, 205 seconds.

In this comparative example, the right-hand member of the equation (2) was 232 seconds, and the ZST value of 205 seconds did not satisfy the equation (2).

During the polymerization period, significant change in the specific melt viscosity was not observed.

EXAMPLE 2

In the same manner as in Example 1 but adding methanol (42 parts) after 9 hours from the polymerization initiation and continuing the polymerization for 47 hours, the polymerization was effected to obtain the copolymer (1,137 parts). M.P., 270° C. Content of HFP, 12.5%. Specific melt viscosity, $14 \times 10^4$ poise. Melt flow ratio, 4.21. ZST, 620 seconds.

The right-hand member of the equation (2) was 410 seconds, and the ZST value of 620 seconds satisfied the equation (2).

The results of the preliminary experiments showed that the specific melt viscosity of the copolymer obtained before the addition of methanol was $350 \times 10^4$ poise, and that of the copolymer obtained after the addition of methanol was $5 \times 10^4$ poise. The weight ratio of the former to the latter was 20:80.

Comparative Example 2

In the same manner as in Example 1 but initiating the polymerization after the addition of methanol (11.2 parts) and continuing the polymerization for 47 hours, the polymerization was effected to obtain the copolymer (1,408 parts). M.P., 270° C. Content of HFP, 12.5%. Specific melt viscosity, $14 \times 10^4$ poise. Melt flow ratio, 3.33. ZST, 300 seconds.

The right-hand member of the equation (2) was 410 seconds, and the ZST value of 300 seconds did not satisfy the equation (2).

As in Comparative Example 1, significant change in the specific melt viscosity was not observed during the polymerization period.

EXAMPLE 3

Preparation of Copolymer A

In the same manner as in Example 1 but adding methanol (45 parts) after 9 hours from the polymerization initiation and continuing the polymerization for 51 hours, the polymerization was effected to obtain the copolymer (1,143 parts). M.P., 272° C. Content of HFP, 12.3%. Specific melt viscosity, $13 \times 10^4$ poise.

Preparation of Copolymer B

In the same manner as in Comparative Example 1 but initiating the polymerization after the addition of methanol (34 parts) and continuing the polymerization for 51 hours, the polymerization was effected to obtain the copolymer (1,042 parts). M.P., 270° C. Content of HFP, 12.5%. Specific melt viscosity, $4.9 \times 10^4$ poise.

Powdery Copolymers A and B in the weight ratio of 50:50 were mixed thoroughly and pelletized with an extruder at 380° C. Specific melt viscosity of the pelletized mixture of Copolymers A and B, $7.9 \times 10^4$ poise. Melt flow ratio, 3.78. ZST, 271 seconds.

The right-hand member of the equation (2) was 262 seconds, and the ZST value of 271 seconds satisfied the equation (2).

Comparative Example 3

The copolymer obtained by the same manner as in Comparative Example 1 but adding methanol (35 parts), the specific melt viscosity being $3.7 \times 10^4$ poise and the copolymer obtained by the same manner as in Comparative Example 1 but adding methanol (14 parts), the specific melt viscosity being $52\times 10^4$ poise in the weight ratio of 7:3 were mixed thoroughly and melt extruded with an extruder to obtain pellets of the mixture. Specific melt viscosity, $8.4\times 10^4$ poise. Melt flow ratio, 3.79. ZST, 264 seconds.

The right-hand member of the equation (2) was 273 seconds, and the ZST value of 264 seconds did not satisfy the equation (2).

EXAMPLE 4

Each copolymer obtained in Examples 1 to 3 and Comparative Examples 1 to 3 was coated on a tin-plated wire having a diameter of 0.7 mm by means of an extruder for wire coating under the following conditions:

| Extruder for wire coating | |
|---|---|
| Diameter of cylinder | 30 mm |
| L/D of screw | 22 |
| Compression ratio | 2.74 |
| Inner diameter of die × outer diameter of chip | 7 mm × 13 mm |
| Drawdown ratio | 82:1 |
| Thickness of coating | 0.35 mm |

The coating rates are shown in the following Table.

TABLE

| Copolymer | Coating rate (m/min.) |
|---|---|
| Example 1 | 55 |
| Comparative Example 1 | 35 |
| Example 2 | 16 |
| Comparative Example 2 | 9 |
| Example 3 | 45 |
| Comparative Example 3 | 37 |

What is claimed is:

1. A mixture of tetrafluoroethylene/hexafluoropropylene copolymers comprising:
   (a) 10 to 70% by weight of a tetrafluoroethylene/hexafluoropropylene copolymer portion comprising 5 to 20% by weight of hexafluoropropylene and having a specific melt viscosity at 380° C. of from $100\times 10^4$ to $1,000\times 10^4$ poise; and
   (b) 90 to 30% by weight of a tetrafluoroethylene/hexafluoropropylene copolymer portion comprising 5 to 20% by weight of hexafluoropropylene and having a specific melt viscosity at 380° C. of from $0.1\times 10^4$ to $60\times 10^4$ poise,
   said mixture having a specific melt viscosity at 380° C. of from $1\times 10^4$ to $60\times 10^4$ poise, a melt flow ratio of at least 3.5 and a zero strength time (ZST, second) at 380° C. satisfying the following equation:

$$ZST \geq \tfrac{1}{4}x^2 + 17x + 107$$

wherein x is (specific melt viscosity) $\times 10^4$.

2. The mixture of copolymers according to claim 1, wherein the specific melt viscosity at 380° C. of the copolymer (a) is from $150\times 10^4$ to $600\times 10^4$ poise, and the specific melt viscosity of the copolymer (b) is from $0.5\times 10^4$ to $20\times 10^4$ poise.

3. The mixture of copolymers according to claim 1, which is prepared by copolymerizing hexafluoropropylene and tetrafluoroethylene in a polymerization vessel to form said copolymer (a) and thereafter introducing a chain transfer agent into said vessel to form said copolymer (b).

4. The mixture of copolymers according to claim 1, which is prepared by preparing copolymer (a), independently preparing copolymer (b) and mixing copolymer (a) and copolymer (b).

5. A process for preparing the mixture of tetrafluoroethylene/hexafluoropropylene copolymers according to claim 1, which comprises mixing 10 to 70% by weight of a tetrafluoroethylene/hexafluoropropylene copolymer comprising 5 to 20% by weight of hexafluoropropylene and having a specific melt viscosity at 380° C. of from $100\times 10^4$ to $1,000\times 10^4$ poise and 90 to 30% by weight of a tetrafluoroethylene/hexafluoropropylene copolymer comprising 5 to 20% by weight of hexafluoropropylene and having a specific melt viscosity of from $0.1\times 10^4$ to $60\times 10^4$ poise.

6. A process for preparing the mixture of tetrafluoroethylene/hexafluoropropylene copolymers according to claim 1, which comprises (a) polymerizing tetrafluoroethylene and hexafluoropropylene to form a tetrafluoroethylene/hexafluoropropylene copolymer portion comprising 5 to 20% by weight of hexafluoropropylene and having a specific melt viscosity at 380° C. of from $100\times 10^4$ to $1,000\times 10^4$ poise and (b) polymerizing tetrafluoroethylene and hexafluoropropylene to form a tetrafluoroethylene/hexafluoropropylene copolymer portion comprising 5 to 20% by weight of hexafluoropropylene and having a specific melt viscosity at 380° C. of from $0.1\times 10^4$ to $60\times 10^4$ poise, the steps (a) and (b) being effected in any order or alternately and the mixture produced comprising 10 to 70% by weight of portion (a) and 90 to 30% by weight of portion (b).

7. The process according to claim 6, which comprises copolymerizing hexafluoropropylene and tetrafluoroethylene to form said copolymer (a) and thereafter adding a chain transfer agent and copolymerizing hexafluoropropylene and tetrafluoroethylene to form said copolymer (b).

8. The process according to claim 7, wherein said chain transfer agent is selected from the group consisting of hydrocarbons, lower alkanols, halogenated hydrocarbons, and ethers.

9. The process according to claim 7, wherein said chain transfer agent is a lower alkanol.

10. The process according to claim 7, wherein said chain transfer agent is methanol.

11. The mixture of copolymers according to claim 1, wherein at least one of said copolymer portions contains a third comonomer component selected from the group consisting of perfluorovinyl ethers, perfluoroallyl ethers, trifluorochloroethylene, trifluoroethylene, vinylidene fluoride, ethylene, and propylene in an amount of not more than about 5% by weight.

12. The mixture of copolymers according to claim 1, which further comprises a perfluorocopolymer selected from the group consisting of polytetrafluoroethylene, copolymers of tetrafluoroethylene and perfluorovinyl ethers, and perfluoroallyl ethers in an amount of not more than about 20% by weight.

* * * * *